(12) United States Patent
Xu

(10) Patent No.: US 8,259,859 B2
(45) Date of Patent: Sep. 4, 2012

(54) METHOD AND SYSTEM FOR CARRIER RECOVERY FOR QAM

(75) Inventor: Honghui Xu, Buffalo Grove, IL (US)

(73) Assignee: Techwell LLC, Milpitas, CA (US)

( * ) Notice: Subject to any disclaimer, the term of this patent is extended or adjusted under 35 U.S.C. 154(b) by 450 days.

(21) Appl. No.: 12/563,850

(22) Filed: Sep. 21, 2009

(65) Prior Publication Data
US 2011/0069789 A1    Mar. 24, 2011

(51) Int. Cl.
    H04L 27/00    (2006.01)
(52) U.S. Cl. ......................................... 375/326
(58) Field of Classification Search ................ 375/326, 375/149, 260, 316, 279, 327, 376; 331/16, 331/354
    See application file for complete search history.

(56) References Cited

U.S. PATENT DOCUMENTS

| | | | |
|---|---|---|---|
| 4,458,356 A | 7/1984 | Toy | |
| 4,587,498 A | 5/1986 | Bonnerot et al. | |
| 4,795,986 A | 1/1989 | Ceroni et al. | |
| 4,866,395 A | 9/1989 | Hostetter | |
| 5,311,546 A | 5/1994 | Paik et al. | |
| 5,410,573 A | 4/1995 | Taga et al. | |
| 5,471,508 A | 11/1995 | Koslov | |
| 5,519,356 A | 5/1996 | Greenberg | |
| 5,940,450 A | 8/1999 | Koslov et al. | |
| 6,133,785 A | 10/2000 | Bourdeau | |
| 6,671,339 B1 | 12/2003 | Ahn | |
| 6,879,646 B2 | 4/2005 | Arambepola | |
| 6,920,189 B1 * | 7/2005 | Spalink | 375/326 |
| 7,277,502 B2 * | 10/2007 | Hayashi et al. | 375/326 |
| 7,283,599 B1 | 10/2007 | Herbig | |
| 7,342,981 B2 * | 3/2008 | Wongwirawat et al. | 375/326 |
| 7,505,543 B2 | 3/2009 | Paille | |
| 7,558,341 B2 | 7/2009 | Han | |
| 2005/0220220 A1 | 10/2005 | Belotserkovsky | |
| 2008/0025389 A1 | 1/2008 | Markman et al. | |
| 2008/0043829 A1 | 2/2008 | Shiue et al. | |

(Continued)

OTHER PUBLICATIONS

ATSC, "N53: ATSC Digital Television Standard, Parts 1-6, 2007", Advanced Television Systems Committee, Inc., Washington, D.C., available online at: <http://www.atsc.org/standards/a53/a_53-Part-1-6-2007.pdf>, 136 pages, Jan. 3, 2007.

(Continued)

Primary Examiner — Khai Tran
(74) Attorney, Agent, or Firm — Fogg & Powers LLC

(57) ABSTRACT

Systems and methods of carrier frequency acquisition or recovery in a receiver. The receiver is able to achieve carrier acquisition when a frequency offset is large (e.g., near a decision boundary). The receiver includes a demodulator, an equalizer, and a carrier recovery module. The carrier recovery module includes a decision device and phase detector, a phase error differentiator, a frequency direction confidence module, and a frequency and phase combiner module. The carrier recovery module calculates a phase error differential between a phase error at a first time and a phase error at a second time. Based on the phase error differential, the frequency direction confidence module generates a frequency offset confidence number. The frequency offset confidence number provides an indication of the direction of a frequency offset and a degree of certainty related to a detected direction (e.g., positive or negative) of the frequency offset. If the confidence number is greater than a threshold value, a joint frequency and phase lock loop ("FPLL") is used for carrier acquisition. If the confidence number is less than the threshold value, a phase lock loop ("PLL") is used for carrier acquisition.

31 Claims, 12 Drawing Sheets

U.S. PATENT DOCUMENTS

2009/0022245 A1  1/2009  Binkley

OTHER PUBLICATIONS

ATSC, ATSC Recommended Practice: Receiver Performance Guidelines (with Corrigendum No. 1 and Amendment No. 1), Doc. A/74, Advanced Television Systems Committee, Washington, D.C., available online at: <http://www.atsc.org/standards/a_74-w-Corr-1-Amend-1.pdf>, 69 pages, Jun. 18, 2004, Corrigendum No. 1 dated Jul. 11, 2007, Amendment No. 1 dated Nov. 29, 2007.

* cited by examiner

METHOD AND SYSTEM FOR CARRIER RECOVERY FOR QAM

BACKGROUND

This invention relates to carrier recovery in digital receivers. Digital wireless communication systems, such as broadcast, wireless LAN, and wide area mobile systems, use quadrature amplitude modulation ("QAM"). QAM is also used in both North American and European digital cable television standards. QAM uses quadrature-carrier multiplexing to allow two double-side-band suppressed-carrier signals modulated by independent messages to occupy the same channel bandwidth.

A QAM modulator 100 is illustrated in FIG. 1, and an isolated, transmitted QAM pulse from the modulator 100 is given below in EQN. 1.

$$s_m(t) = d_{R,m} q(t) \cos(2\pi f_c t) - d_{I,m} q(t) \sin(2\pi f_c t) = Re[d_m q(t) e^{j2\pi f_c t}] \quad \text{EQN. 1}$$

where $f_c$ is a modulating carrier frequency; q(t) 105 is a pulse shaping filter; $d_{R,m}$ and $d_{I,m}$ represent a real or in-phase component and an imaginary or quadrature component, respectively, of a complex QAM symbol; and m=1 ... M indexes a 2-dimensional QAM constellation of cardinality M. A continuous series of transmitted QAM pulses, $s_m(t)$, passes through a noisy multipath channel at a rate of $f_s = 1/T_s$, where $f_s$ is the symbol rate and $T_s$ is the symbol duration time. Thus, the received signal at the input to a QAM demodulator 110 (see FIG. 2) of a receiver is given by $r(t) = s_m(t) * c(t) + v(t)$, where * denotes convolution, c(t) is the channel impulse response, and v(t) is additive white Gaussian noise. The received signal, r(t), is given below in EQN. 2.

$$r(t) = Re\left\{ e^{j2\pi(f_{LO} + f_o)t + \theta_o} \sum_{n=-\infty}^{+\infty} [d[n] * q(t)] c(t - nT_s) \right\} + v(t) \quad \text{EQN. 2}$$

where d[n] is the complex transmitted symbol, and $f_o$ and $\theta_o$ are the frequency and phase offsets, respectively, of a local oscillator with respect to the modulator 100. The frequency of the local oscillator is given as $f_{LO} = f_c - f_o$.

For descriptive purposes, the receiver is assumed to have perfect symbol timing recovery. As such, sampling r(t) at $kT_s$, where k is an integer timing index, results in EQN. 3.

$$r(kT_s) = Re\left\{ e^{j2\pi(f_{LO} + f_o)kT_s + \theta_o} \sum_{n=-\infty}^{+\infty} [d[n] * q(kT_s)] c(kT_s - nT_s) \right\} + v(kT_s) \quad \text{EQN. 3}$$

After the received signal is matched filtered and demodulated, the signal input to an equalizer 115 is given below by EQN. 4.

$$x(kT_s) = x[k] = e^{j2\pi f_o kT_s + \theta_o} \sum_{n=-\infty}^{+\infty} d[n] c[k-n] + v'[k] \quad \text{EQN. 4}$$

where v'[k] is complex filtered noise, and inter-symbol interference ("ISI") present in x(k) is due only to the channel impulse response c(k).

Following demodulation and assuming perfect equalization, a near-baseband complex sequence, y[k], shown in EQN. 5 is output from the equalizer 115.

$$y[k] = d[k] e^{j2\pi f_o kT_s + \theta_o} + v'[k] \quad \text{EQN. 5}$$

As such, the recovered near-baseband sequence represents a transmitted constellation rotating at a frequency, $f_o$, and having a phase offset, $\theta_o$. For the receiver to reliably recover the transmitted complex QAM symbol (i.e., $d_{R,M}$ and $d_{I,M}$), using, for example, a two-dimensional slicer, the receiver must remove the frequency offset, $f_o$, that causes the constellation to rotate. The receiver must also remove the phase offset, $\theta_o$, which otherwise leaves the constellation in a static-rotated position.

An example of a transmitted constellation 200 for 4-QAM (also known as quadrature phase-shift keying ("QPSK")) prior to modulation is illustrated in FIG. 3, and an example of a received, rotated constellation 205 with a phase offset, $\theta_o$, is illustrated in FIG. 4. The number of samples required to see a full 360-degree rotation of the constellation is given by $f_s/f_o$, and the direction of rotation depends on whether the frequency offset, $f_o$, is positive or negative with respect to the modulating carrier frequency, $f_c$. For example, if a symbol, a, is repeatedly transmitted and $f_s/f_o = -6$ and $\theta_o = -45°$, the first 6 received samples are positioned as illustrated in the constellation 210 of FIG. 5.

Some carrier recovery algorithms (e.g., blind carrier recovery algorithms) extract the carrier frequency and phase information using nonlinear operations. If the frequency offset, $f_o$, is large, the high bandwidth filters used in the receiver introduce a significant amount of noise into the detected phase error signal. The noise limits the frequency-offset pull-in range of a receiver and causes phase jitter in the received signals.

Other carrier recovery algorithms use a blind equalization algorithm in combination with a decision directed ("DD") carrier recovery algorithm. The blind equalization algorithm is used to equalize a communications channel having phase ambiguity, and the DD carrier recovery algorithm detects the phase error based on the equalizer output and a symbol decision. For example, a transmitted symbol is given as d[k], an output of the equalizer 115 is given as y[k], a frequency offset is given as f, and an initial carrier phase offset is given as $\theta_o$. If perfect equalization takes place (and ignoring noise), the output of the equalizer 115 is given by EQN. 6.

$$y[k] = d[k] e^{j2\pi f_o kT + \theta_o} \quad \text{EQN. 6}$$

The phase error, $\phi[k]$, between the equalizer output, y[k], and transmitted symbol, d[k], is given by EQN 7.

$$\phi[k] = 2\pi f_o kT + \theta_o \quad \text{EQN. 7}$$

A frequency detector can achieve fast acquisition and successful frequency-offset pull-in using a differential error, e[k], between the phase error at a first time, $\phi[k]$, and the phase error at a second (delayed) time, $\phi[k-1]$, as shown below in EQN 8.

$$e[k] = \phi[k] - \phi[k-1] = 2\pi f_o T \quad \text{EQN. 8}$$

If the differential error, e[k], is positive, a positive frequency offset exists. If the differential error, e[k], is negative, a negative frequency offset exists. Additionally, the magnitude of the differential error, e[k], is proportional to the absolute value of a frequency offset, $f_o$.

The phase error, $\phi[k]$, is detected using any of a variety of techniques. One such technique is described below with reference to EQN. 9.

$$\hat{\phi}[k] = CIm(y[k] \hat{d}^*[k]) \quad \text{EQN. 9}$$

where C is a constant, Im indicates the imaginary component of a complex number, (●) indicates a conjugate, and $\hat{d}[k]$ is a two-dimensional sliced symbol decision based on the equalizer output, y[k] EQN. 9 indicates that the decision device affects the phase estimation. Additionally, when using DD carrier recovery techniques, decision boundaries cause a phase jump (e.g., a 90° phase jump). As an illustrative example, FIG. 6 illustrates a QPSK constellation 215 and decision boundaries 220. FIG. 7 illustrates a phase error plot 225 and the phase jumps which occur when the phase error, $\phi(k)$, crosses one of the decision boundaries 220. As shown in FIG. 7, the phase error is periodic. As a result of the phase jump, the frequency offset, $f_o$, which is determined using the differential error, is no longer valid. Averaging the differential error results in a value of zero, and therefore, does not provide a correct indication of the direction of the frequency offset, $f_o$. As an additional consequence, as the frequency offset, $f_o$, increases in magnitude, the phase jump is increasingly difficult to identify, because a large frequency offset makes each phase change appear to be a phase jump. Accordingly, conventional carrier recovery techniques fail in the presence of large frequency offsets.

SUMMARY

Communication systems that use quadrature amplitude modulation ("QAM") often use a phase-lock loop ("PLL") for carrier signal recovery. However, for the PLL to operate correctly, a frequency offset, $f_o$, of a received signal must be much smaller than the symbol rate (e.g., one-eighth the symbol rate), or the PLL is unable to lock to a correct carrier frequency.

Embodiments of the invention provide systems and methods for carrier signal frequency acquisition or recovery in a receiver. The receiver is able to correctly detect the direction of a frequency offset when the frequency offset, $f_o$, is large. The receiver includes, among other things, a demodulator, an equalizer, and a carrier recovery module. The carrier recovery module includes a decision device and phase detector, a phase error differentiator, a frequency direction confidence module, and a frequency and phase combiner module. The decision device and phase detector calculates a phase error for a received signal. The phase error differentiator calculates a phase error differential between a phase error at a first time and a phase error at a second time. Based on the phase error differential, the frequency direction confidence module generates a frequency offset confidence number. The frequency offset confidence number provides an indication of, for example, the direction (e.g., positive or negative) of a frequency offset and a degree of certainty related to the direction of the frequency offset.

The frequency and phase combiner uses the phase error, the calculated phase error differential, and the confidence number to select and implement one of a plurality of carrier recovery techniques. If the confidence number is greater than a first threshold value, a joint frequency and phase lock loop ("FPLL") is used for carrier acquisition. If the confidence number is less than the first threshold value, a phase lock loop ("PLL") is used for carrier acquisition. A control module within the frequency and phase combiner module is used to delay carrier acquisition (e.g., freeze a carrier acquisition feedback loop) if a frequency offset is near a decision boundary. Delaying carrier acquisition allows the frequency offset confidence number to increase, and therefore, increase the degree of certainty in the detected frequency offset direction.

In one embodiment, the invention provides a method of carrier recovery in a digital receiver. The receiver is configured to receive radio frequency signals modulated with data including a complex transmitted symbol having an in-phase component and a quadrature component. The receiver is also configured to determine a frequency offset direction. The method includes demodulating, in a demodulator, the received radio frequency signals to produce the in-phase and the quadrature components of the complex transmitted symbol, determining a first phase error at a first time and a second phase error at a second time, and calculating a phase error differential between the first phase error at the first time and the second phase error at the second time. An offset confidence number is generated based at least in part on the phase error differential, and a frequency offset direction is determined based at least in part on the offset confidence number. The offset confidence number provides an indication of a degree of certainty of the determined frequency offset direction.

In another embodiment, the invention provides a method of tracking phase in a digital receiver. The receiver is configured to receive radio frequency signals modulated with data including a complex transmitted symbol having a real component and an imaginary component. The method includes demodulating, in a demodulator, the received radio frequency signals to produce the real and the imaginary components of the complex transmitted symbol, and calculating a phase error differential between a first phase error at a first time and a second phase error at a second time. The method also includes generating an offset confidence number based at least in part on the phase error differential, and determining a frequency offset direction based at least in part on the offset confidence number.

In yet another embodiment, the invention provides a system for carrier recovery in a digital receiver. The system is configured to receive radio frequency signals modulated with data including a complex transmitted symbol having an in-phase component and a quadrature component. The system includes a demodulator and a carrier recovery module. The demodulator is configured to demodulate the received radio frequency signals to produce the in-phase and the quadrature components of the complex transmitted symbol. The carrier recovery module is configured to calculate a phase error differential between a first phase error at a first time and a second phase error at a second time, generate an offset confidence number based at least in part on the phase error differential, and determine a frequency offset direction based at least in part on the offset confidence number. The offset confidence number provides an indication of a degree of certainty of the determined frequency offset direction.

In one particular embodiment, the invention provides a device configured to process digital signals. The device includes a receiver having a demodulator, an equalizer, and a carrier recovery module. The receiver is configured to receive quadrature amplitude modulated ("QAM") signals with data including a complex transmitted symbol having a real component and an imaginary component. The demodulator is configured to demodulate the QAM signals to produce the real and the imaginary components of the complex transmitted symbol. The carrier recovery module is configured to calculate a phase error differential between a first phase error at a first time and a second phase error at a second time, generate an offset confidence number based at least in part on the phase error differential, and determine a frequency offset direction based at least in part on the offset confidence number.

In another particular embodiment, the invention provides a method of carrier recovery in a digital receiver. The receiver is configured to receive quadrature amplitude modulated ("QAM") signals with data including a complex transmitted symbol having a real component and an imaginary component. The method includes demodulating, in a demodulator, the received QAM signals to produce the real and the imaginary components of the complex transmitted symbol, calculating a phase error differential between a first phase error at a first time and a second phase error at a second time, generating an offset confidence number based at least in part on the phase error differential, and determining a frequency offset direction based at least in part on the offset confidence number.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Additionally, terms such as "first," "second," "third," and "fourth," used herein to describe elements both in the specification and in the claims, are used for descriptive purposes only. The use of such terms does not require and does not imply, in the specification or in the claims, elements having numerically preceding terms. For example, if an element is identified as "a first element" in the specification, it may be referred to as "a third element" in the claims without implying or requiring the presence of "a first element" and "a second element" in the claims unless explicitly recited. Similarly, an element identified as "a third element" in the specification may be referred to as "a first element" in the claims.

Embodiments of the invention described herein relate to systems and methods of carrier signal frequency recovery in a receiver when a frequency offset, $f_o$, is large. The receiver includes, among other things, a demodulator, an equalizer, and a carrier recovery module. The carrier recovery module includes a decision device and phase detector, a phase differentiator, a frequency direction confidence module, and a frequency and phase combiner module. The decision device and phase detector detects a phase error for a received signal. The phase error differentiator calculates a phase error differential between a phase error at a first time and a phase error at a second time. Based on the phase error differential, the frequency direction confidence module generates a frequency offset confidence number. The frequency offset confidence number provides an indication of, for example, the direction (e.g., positive or negative) of a frequency offset and a degree of certainty related to the direction of the frequency offset. The frequency and phase combiner uses the phase error, the calculated phase error differential, and the confidence number to select and implement one or more carrier recovery techniques. If the confidence number is greater than a first threshold value, a joint frequency and phase lock loop ("FPLL") is used for carrier acquisition. If the confidence number is less than the first threshold value, a phase lock loop ("PLL") is used for carrier acquisition.

Figure 8:
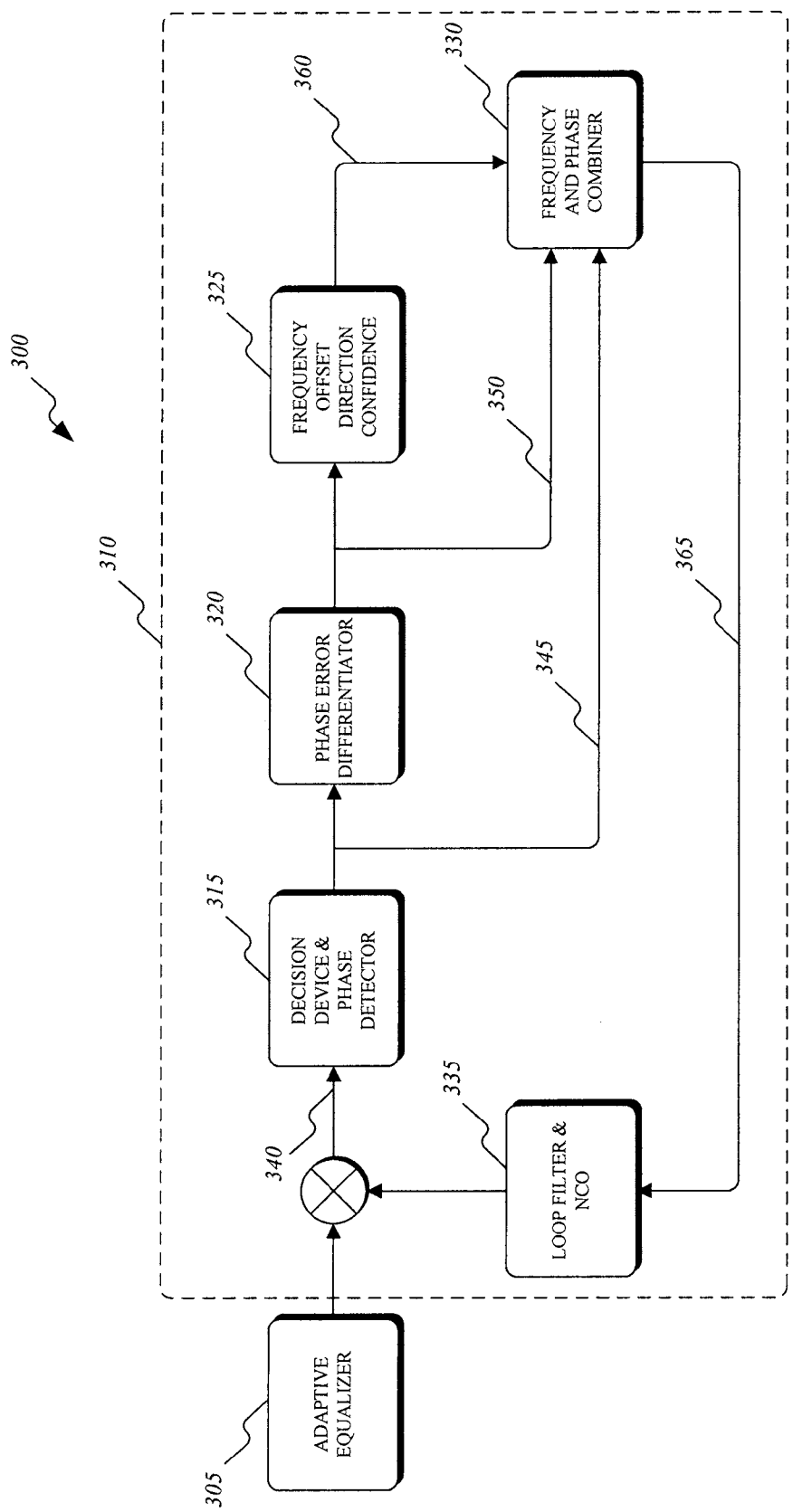
FIG. 8 is a diagram of a carrier recovery system according to an embodiment of the invention.

A carrier recovery system 300 is shown in FIG. 8. A received QAM signal is equalized by an adaptive equalizer 305 and input to a carrier recovery module or loop 310. The carrier recovery module 310 includes a decision device and phase detector 315, a phase error differentiator 320, a frequency offset direction confidence module 325, a frequency and phase combiner module 330, and a loop filter and a numerically controlled oscillator ("NCO") module 335. A rotator multiplies the output of the equalizer 305 by a feedback signal to correct a phase error. A de-rotated signal 340 is input to the decision device and phase detector 315, which detects the phase error between a transmitted symbol and the de-rotated signal 340. The decision device is, for example, a slicer or a Viterbi decoder, and is used to generate a decision based on the de-rotated signal 340. The phase detector detects phase error 345 based on the equalizer output and the decision device output. A phase detection technique, such as that provided in EQN. 9, is used to generate a phase error, $\phi(k)$, 345. In other embodiments, different decision devices and phase detectors are used.

Figure 6:
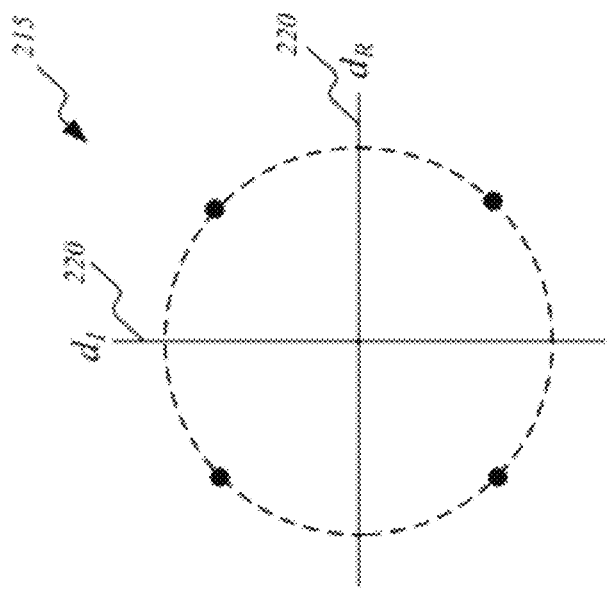
FIG. 6 illustrates a QPSK constellation and decision boundaries.

With reference to the phase detection technique of EQN. 9, the detected phase error, $\phi(k)$, has a phase ambiguity of $\pi/2$ radians, and is periodic at the frequency of $(f_s/f_o)/4$, where $f_s=1/T_s$ is the symbol rate. As a consequence, a decision directed ("DD") phase and/or frequency recovery system is limited to a frequency offset range of, $f_o=-f_s/8 \ldots f_s/8$. When the frequency offset, $f_o$, is outside of this range, the determined frequency offset direction is unreliable due to the number of samples with phase offsets which cross the decision boundaries 220 of FIG. 6. Although the carrier recovery system remains able to be locked by pulling the frequency offset, $f_o$, in the wrong direction, an extra rotation of r/2 radians exists between consecutive symbols, and the subsequent decoding device is unable to detect the additional $\pi/2$ radians rotation.

Because of the limited frequency offset range for which the carrier recovery system is able to correctly determine a frequency offset direction, keeping the frequency offset within the frequency offset range (e.g., within $+/-f_s/8$) allows the system to correctly lock into the carrier frequency. However, when an initially detected frequency offset, $f_o$, is within the frequency offset range but near the upper or lower limit of the frequency offset range, carrier recovery operations often increase the frequency offset, $f_o$. This increase in frequency offset is a result of an initially detected phase error, $\phi(k)$, which contains random noise often sufficient to generate a residual frequency offset that pushes the initially detected frequency offset, $f_o$, outside of the frequency offset range.

Figure 9:
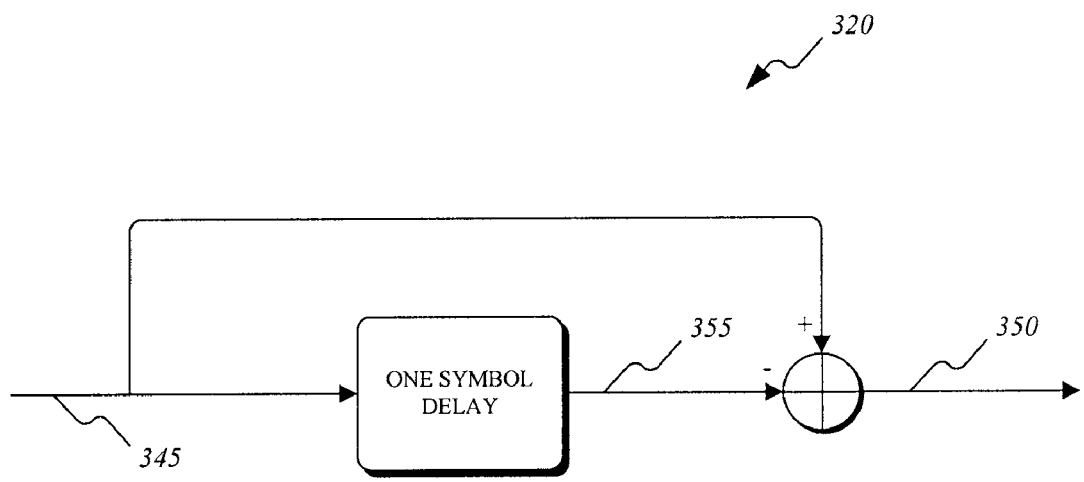
FIG. 9 is a diagram of a phase error differentiator.

The detected phase error, $\phi(k)$, 345 is sent to a phase error differentiator 320 to calculate a phase error differential 350. The structure of the phase error differentiator 320 is illustrated in FIG. 9. The phase error differentiator 320 calculates the phase error differential 350 by subtracting a one-symbol delayed version of the phase error 355 from the current phase error 345. With reference once again to FIG. 8, the phase error differential 350 is processed in the frequency offset direction confidence module 325. The output of the frequency offset direction confidence module 325 is a frequency offset confidence number 360. The sign of the confidence number 360 indicates the sign of the frequency offset, and the absolute value of the confidence number 360 indicates, among other things, the reliability of frequency direction detection, as described in greater detail below. In frequency and phase combiner module 330, a signal 365 is generated which depends on the confidence number 360. The signal 365 has a value of, for example, zero, the phase error, or a summation of the phase error and phase error differential. The signal 365 is sent to the loop filter and NCO module 335 before being input to the rotator to compensate the phase error of the equalizer output.

Figure 1:
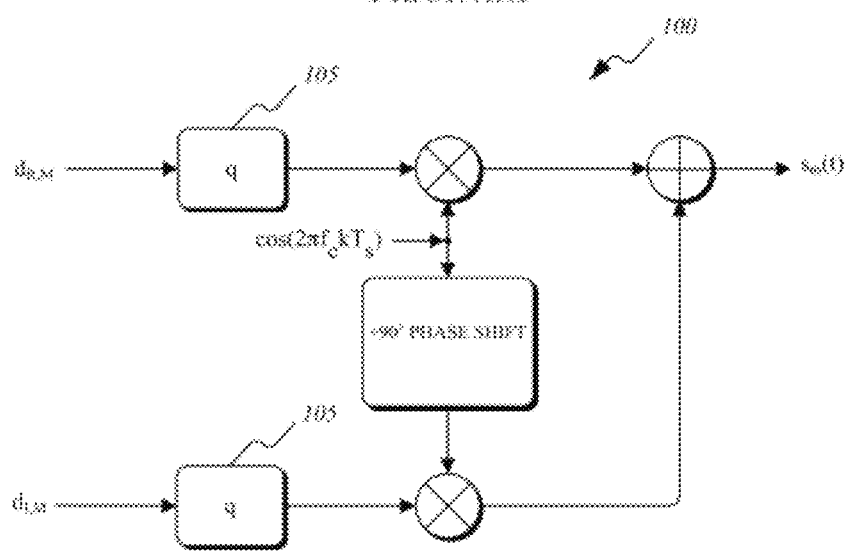
FIG. 1 illustrates a quadrature amplitude modulation ("QAM") modulator.
Figure 2:
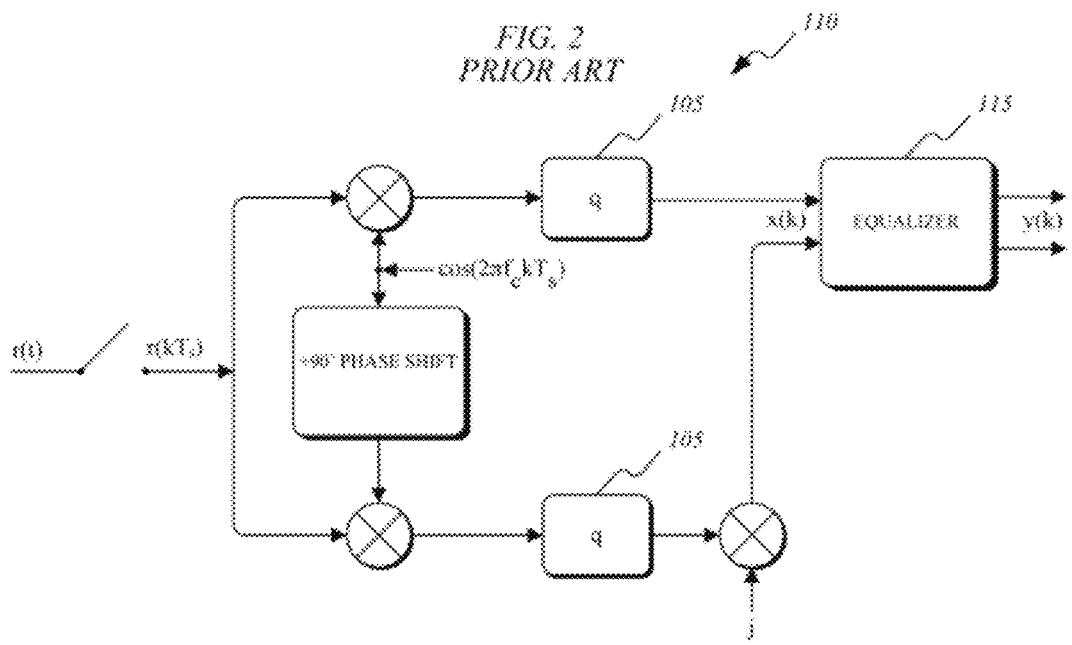
FIG. 2 illustrates a QAM demodulator.
Figure 3:
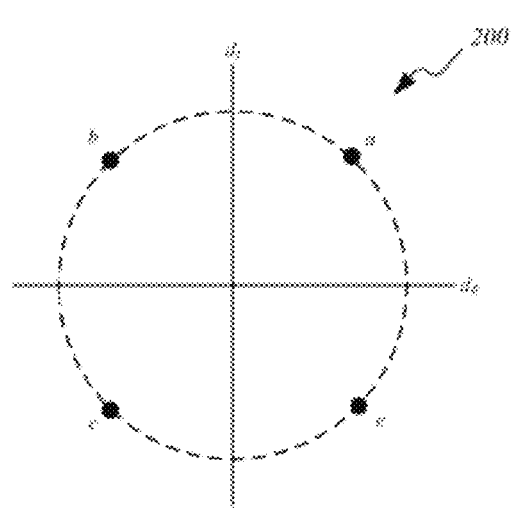
FIG. 3 illustrates a received quadrature phase-shift keying ("QPSK") constellation.
Figure 4:
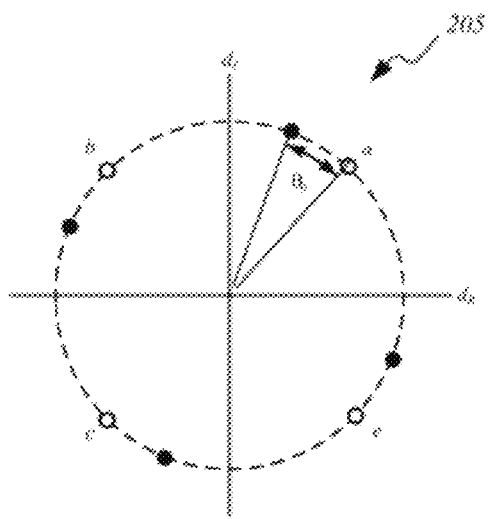
FIG. 4 illustrates a received, rotated QPSK constellation having a phase offset.
Figure 5:
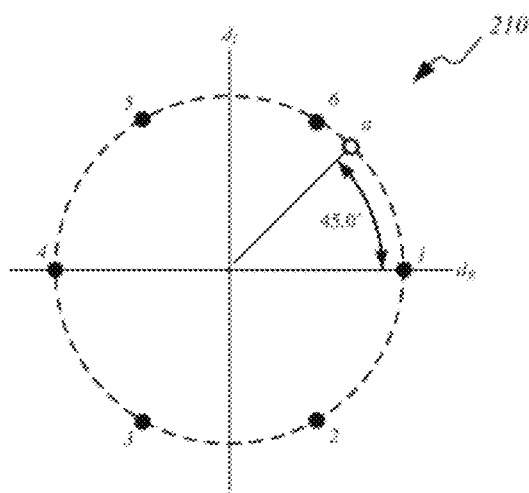
FIG. 5 illustrates another received, rotated QPSK constellation having a phase offset.
Figure 7:
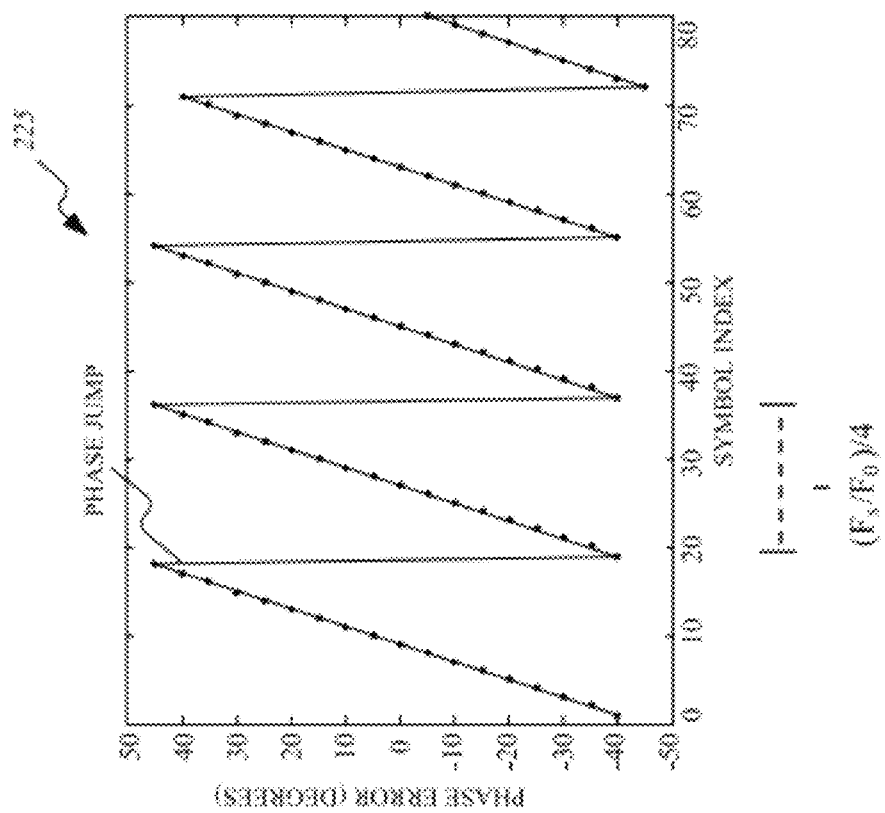
FIG. 7 illustrates a phase jump when a phase offset passes a decision boundary.

As previously described, the phase error differential 350 is proportional to the frequency offset with the exception of a phase jump caused by the crossing of a decision boundary. The phase jump is difficult and sometimes impossible to detect by comparing the value of the phase error differential 350 to a predetermined threshold when the frequency offset, $f_o$, is large. In the carrier recovery module 310, the direction of the frequency offset, $f_o$, is determined by comparing timing spans of increased phase error with timing spans of decreased phase error. With reference to FIG. 7, the phase error value increases for most symbols because the frequency offset is positive. The decreased phase error (i.e., the sudden sign change) is caused by a phase jump and only occurs for a few symbols. In some embodiments of the invention, the frequency offset direction is determined by comparing the number of positive phase error differentials to the number of negative phase error differentials. If there are more positive phase error differentials than negative phase error differentials, the frequency offset is positive. If there are more negative phase error differentials, the frequency offset is negative. However, if the frequency offset, $f_o$, is approximately equal to the upper or lower limit of the frequency offset range (e.g., $\pm f_s/8$), the number of positive phase error differentials is approximately equal to the number of negative phase error differentials, and the frequency offset confidence number 360 is used to determine the direction of the frequency offset.

Figure 10:
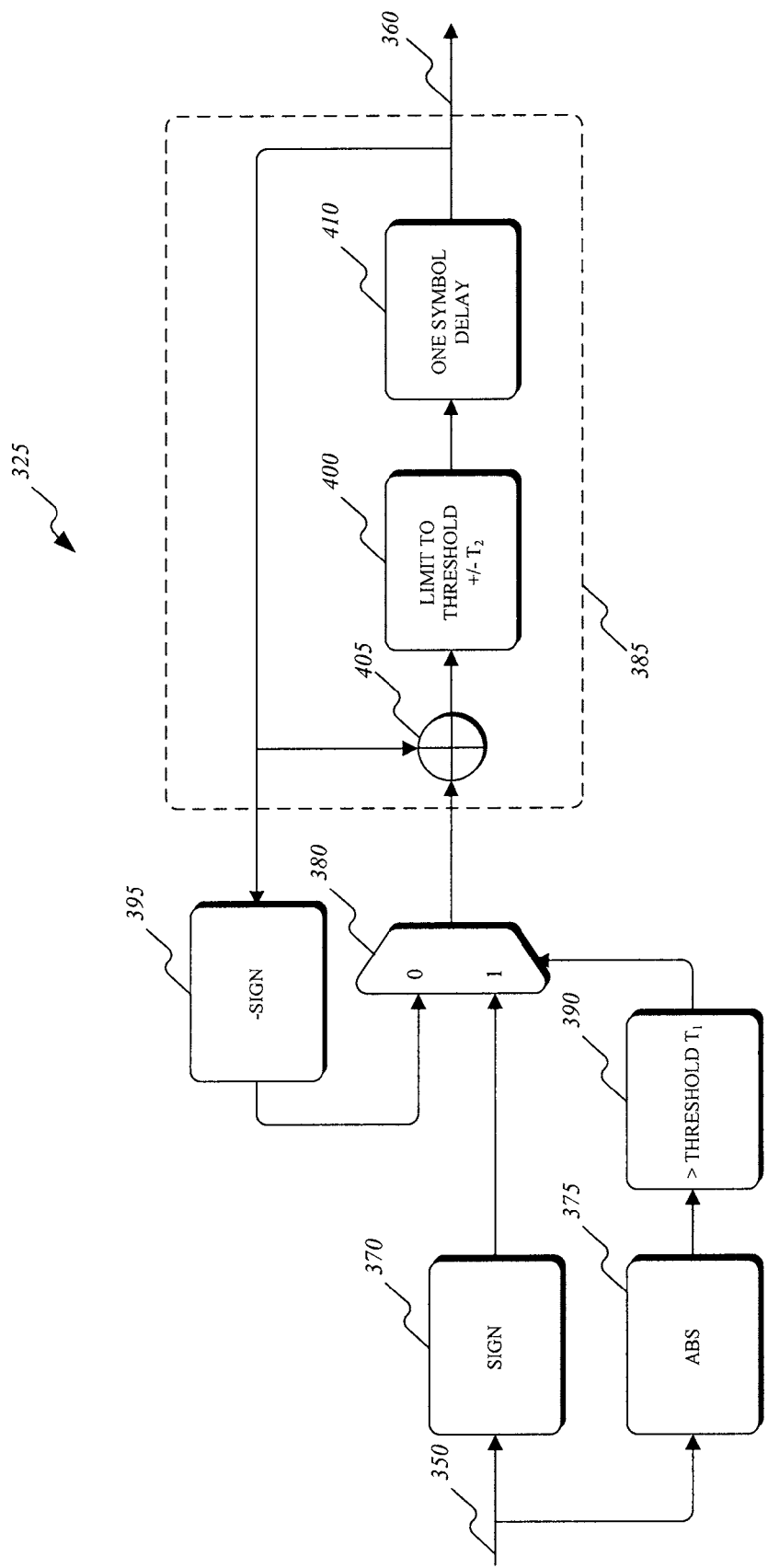
FIG. 10 is a diagram of a frequency direction confidence module.

The frequency offset direction confidence module 325 is illustrated in greater detail in FIG. 10. The frequency offset direction confidence module 325 is used to generate the frequency offset confidence number 360. The phase error differential 350 is input to both a sign module 370 and an ABS module 375. Assuming for a moment that a multiplexer 380 is not included in the frequency offset direction confidence module 325, the sign of the phase error differential 350 is sent directly to an accumulator 385. If a calculated confidence number 360 is positive (e.g., there are more positive phase error differentials than negative phase error differentials) or negative (e.g., there are more negative phase error differentials than positive phase error differentials), the sign of the confidence number 360 indicates the direction of the frequency offset. Additionally, as an absolute value of the confidence number 360 increases, the degree of certainty for the direction of the frequency offset also increases.

If the frequency offset, $f_o$, is small (e.g., close to zero), the PLL is used to pull in the frequency offset. However, if the frequency offset is not small, an FPLL is used. A threshold comparator 390 compares the absolute value of the phase error differential from the ABS module 375 to a first threshold value, $T_1$, to determine if the frequency offset is small. The threshold comparator 390, the multiplexer 380, and a negative-sign module 395 function together as a leaking system. For example, if the absolute value of the phase error differential 350 is smaller than the first threshold, $T_1$, the absolute value of the confidence number 360 is decreased by one for each corresponding symbol (i.e., the output of the multiplexer 380 takes on the sign from the negative-sign module 395, which results in a reduction of the absolute value of the confidence number). If the frequency offset remains small for a predetermined period of time, the absolute value of the confidence number 360 continues to decrease and gradually leaks to zero, regardless of the sign of the confidence number 360. If the absolute value of the phase error differential 350 is greater than the first threshold, $T_1$, the output of the multiplexer 380 takes on the sign from the sign module 370, and the confidence number 360 is updated (e.g., increased, decreased, held at the same value, etc.) based at least in part on the output of the multiplexer 380. A limiter 400 is used to limit an absolute value of the confidence number 360 to a second threshold, $T_2$. The value of the second threshold, $T_2$, determines how fast the confidence number 360 leaks to zero. The leaking system also functions as a natural phase lock detector. For example, when the output of the accumulator 385 is near zero, the frequency offset is also near zero.

As illustrated in FIG. 10, when the leaking system is included in the frequency offset direction confidence module 325, the sign of the phase error differential 350 is sent from the sign module 370 to the multiplexer 380 and then on to the accumulator 385. An adder 405 within the accumulator 385 sums the output from the multiplexer 380 and the current value of the confidence number 360. The output of the adder 405 is limited to a range of plus or minus the second threshold, $T_2$, by the limiter 400. The output of the limiter 400 is delayed by, for example, one symbol, in a delay module 410 before the accumulator 385 outputs the updated confidence number 360.

As described above, the confidence number 360 provides a variety of information to the carrier recovery system 300. Among other things, the confidence number 360 provides indications of three conditions of a received signal: (1) during frequency recovery, the sign of the confidence number 360 is related to the frequency offset direction; (2) the absolute value of the confidence number 360 indicates a degree of confidence for the detected direction of the frequency offset; and (3) the absolute value of the confidence number indicates if the residual frequency offset is small. This information is used in the frequency and phase combiner module 330 to generate an input for the loop filter and NCO module 335 illustrated in FIG. 8.

Figure 11:
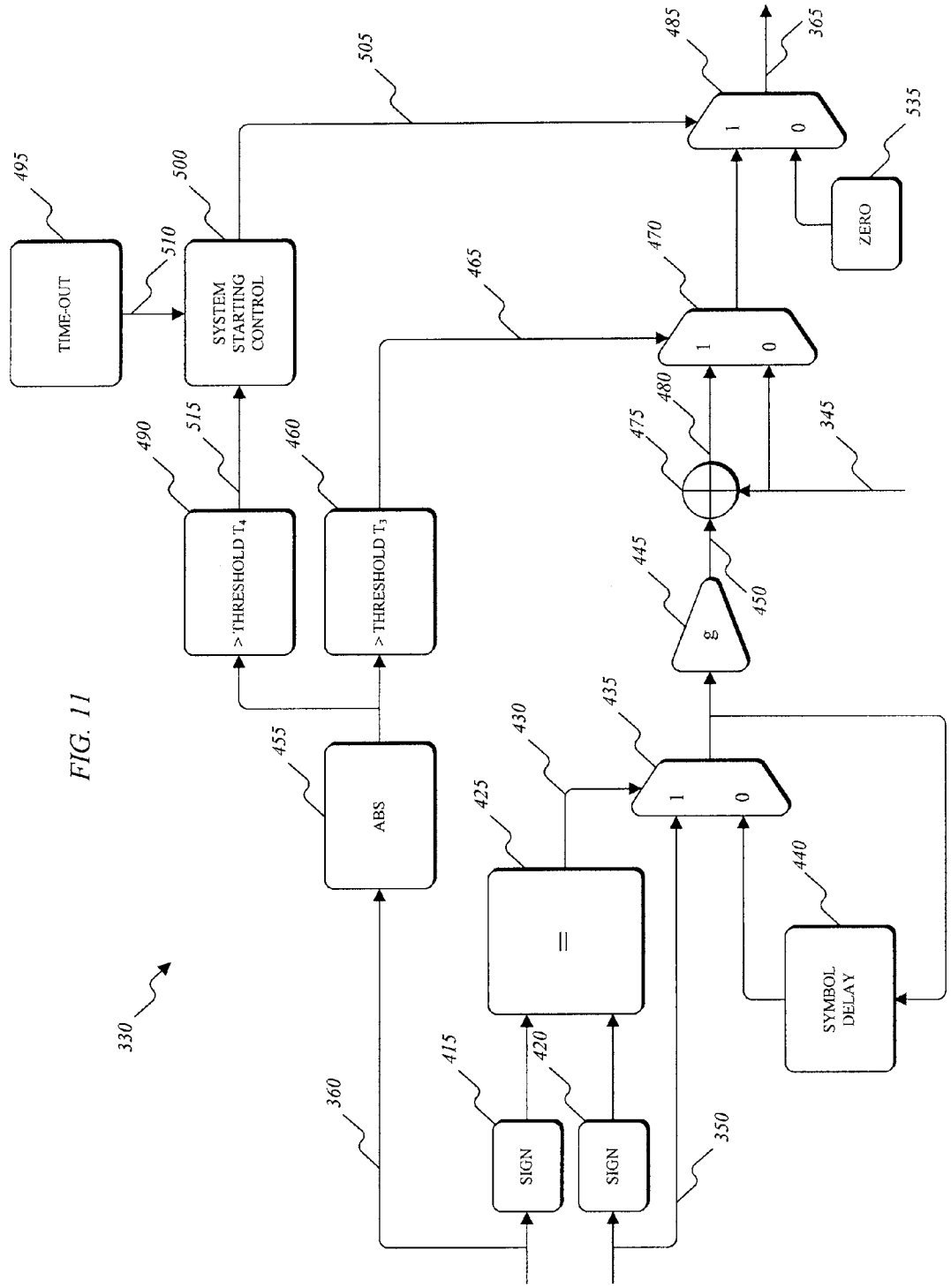
FIG. 11 is a diagram of a frequency and phase combiner module.

The frequency and phase combiner module 330 is illustrated in FIG. 11. A first sign module 415 determines the sign of the confidence number 360, and a second sign module 420 determines the sign of the phase error differential 350. The signs of the phase error differential 350 and the confidence number 360 are compared in a comparison module 425. If the signs of the phase error differential 350 and the confidence number 360 are the same, the phase error differential 350 is a result of the frequency offset, $f_o$, and is used for carrier recovery. If the signs of the phase error differential 350 and the confidence number 360 are not the same, the phase error differential 350 is a result of a phase jump from a decision boundary crossing and is discarded (i.e., not used for carrier recovery). The output signal 430 of the comparison module 425 controls the multiplexer 435. If the signal 430 is one (i.e., the phase error differential 350 and the confidence number 360 have the same sign), the phase error differential 350 is used for carrier recovery. If the signal 430 is zero, the phase error differential 350 is discarded. In place of the discarded phase error differential (e.g., a current value of the phase error differential), a previous value of the phase error differential 350 is used after a symbol delay in a delay module 440. The output of the multiplexer 435 is then multiplied by a gain, g, in a gain module 445 (e.g., to control a convergence speed of the carrier recovery system 300). The output 450 of the gain module 445 is a gain adjusted phase error differential.

The absolute value of the confidence number 360 is obtained in an ABS module 455 and is compared to a third threshold, $T_3$, in a threshold comparison module 460. If the absolute value of the confidence number 360 is greater than the third threshold, $T_3$, there is high confidence that a large frequency offset is present. In such an instance, an FPLL is used to achieve fast carrier acquisition. If the absolute value of the confidence number 360 is not greater than the third threshold, $T_3$, a PLL is used (e.g., to ensure low phase jitter). The output 465 of the threshold comparison module 460 controls a multiplexer 470. The gain adjusted phase error differential 450 is added to the phase error 345 at a summation module 475 to obtain a joint frequency and phase quantity 480. The frequency and phase quantity 480 and the phase error 345 are input to the multiplexer 470. When the output 465 of the threshold comparison module 460 is one (e.g., the absolute value of the confidence number is greater than the third threshold, $T_3$), both frequency and phase information pass through the multiplexer 470. If the output 465 of the threshold comparison module 460 is zero, only the phase error is passed by the multiplexer 470.

Another multiplexer 485 follows the multiplexer 470 to ensure carrier recovery when the frequency offset is close to the boundary of the frequency offset range (e.g., $\pm f_s/8$). The absolute value of the confidence number 360 is compared to a fourth threshold, $T_4$, in a threshold comparison module 490 to ensure that the frequency offset direction is correctly detected. The output of the threshold comparison module 490 and a time-out signal from a time-out module 495 are input to the system starting control module 500, and a control signal 505 is output from the system starting control module 500. If the control signal 505 has a value of one, the frequency offset direction detected using the confidence number 360 is correct, or the frequency offset is small (e.g., close to zero). If the control signal 505 is zero, the carrier recovery loop is frozen and prevented from recovering the carrier signal until the frequency offset direction confidence number 360 is greater than the fourth threshold, $T_4$. As such, by waiting until the confidence number 360 is greater than the fourth threshold, $T_4$, the starting control module 500 prevents wandering of the feedback signal 365 at system initiation, and prevents the frequency offset, $f_o$, from crossing the decision boundaries 220.

Figure 12:
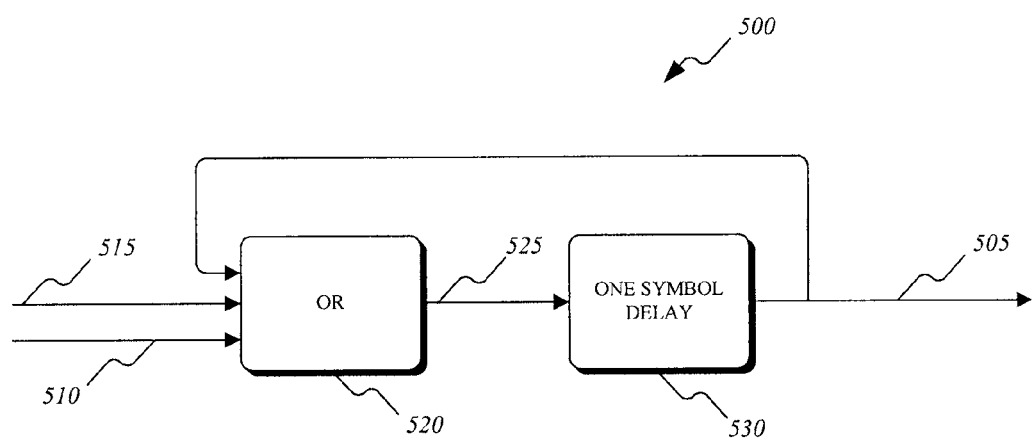
FIG. 12 is a diagram of a system starting control module.

FIG. 12 illustrates the system starting control module 500. A time-out signal 510, an output 515 of the threshold comparison module 490, and the control (feedback) signal 505 are input to an OR gate 520. The output 525 of the OR gate 520 is delayed by one symbol in a symbol delay module 530 to generate the control signal 505. The OR gate 525 has an initial output value of zero. If either signal 510 or signal 515 have a value of one, the output 525 of the OR gate 520 is set to one. For example, if the frequency offset, $f_o$, is large, the output 515 of the threshold comparison module 490 is one, and the output 525 of the OR gate 520 is set to one. If the frequency offset is small, the confidence number 360 is small, the absolute value of the confidence number 360 does not exceed the fourth threshold, $T_4$, and the output 515 of the threshold comparison module 490 remains at zero. The time-out signal 510 is changed from zero to one when the time-out period expires to ensure that the output 525 of the OR gate 520 is changed to one. Accordingly and with reference once again to FIG. 11, the control signal 505 selects the '0' path of the multiplexer 485 for only a limited time period. A zero module 535 holds one input of the multiplexer 485 at a constant value of zero. The time-out period is selected such that, when the frequency offset is initially large, the absolute value of the confidence number 360 is able to exceed the fourth threshold, $T_4$, before the time-out period expires. As such, after the time-out period expires and if the confidence number 360 falls below the fourth threshold, $T_4$, the control signal 505 continues to select the '1' path of the multiplexer 485.

As previously described, the control signal 505 is set to '1' and the FPLL is used when the absolute value of the confidence number 360 is greater than the fourth threshold, $T_4$. As such, the frequency information in the output 365 of the multiplexer 485 pulls the carrier recovery system 300 in the correct direction, and prevents the residual frequency offset from pushing the initially detected frequency offset, $f_o$, out of the frequency offset detection range (e.g., $+/-f_s/8$).

In some embodiments, the second, third, and fourth thresholds $T_2$, $T_3$, and $T_4$ described above are selected according to the following relation: $T_2 > T_4 \geq T_3$. The third threshold, $T_3$, determines whether the FPLL is used, and is selected such that the sign of the confidence number 360 matches the sign of the frequency offset when the absolute value of the confidence number 360 is greater than the third threshold, $T_3$. A difference between the second threshold, $T_2$, and the third threshold, $T_3$, determines how fast the absolute value of confidence number 360 leaks to a value smaller than the third threshold, $T_3$ (e.g., leaks to zero). The value of the fourth threshold, $T_4$, is set between the values of the second threshold, $T_2$, and the third threshold, $T_3$, to allow for a fast carrier recovery system start. Additionally, when the frequency offset, $f_o$, is large, the fourth threshold, $T_4$, prevents the absolute value of the confidence number 360 from frequently dropping below the third threshold, $T_3$, and thus prevents the FPLL from erroneously turning off.

Figure 13:
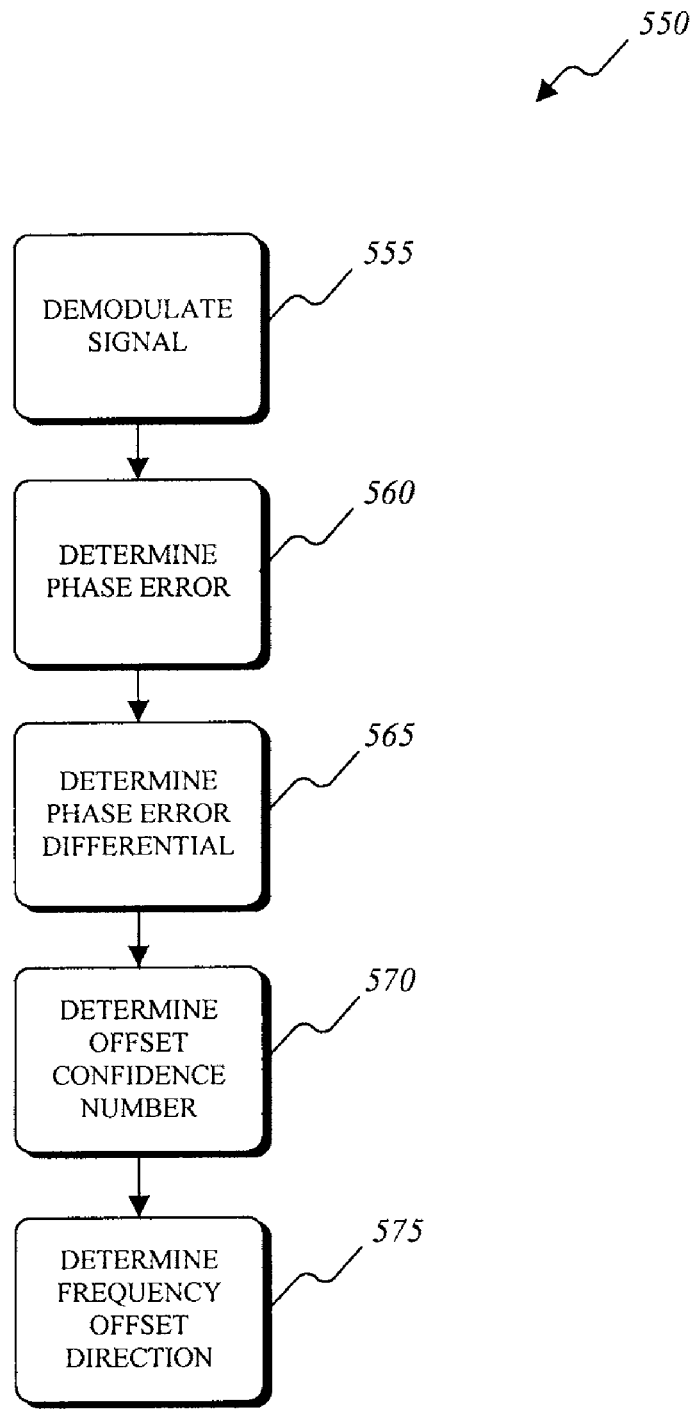
FIG. 13 is a process for carrier recovery in the system of FIG. 8.

A process 550 for carrier recovery is illustrated in FIG. 13. The process includes demodulating a received QAM signal (step 555) in, for example, the QAM demodulator 110. The phase error 345 of the demodulated signal is determined (step 560) in the decision device and phase detector 315. The phase error differential 350 is determined (step 565) based on the phase error 345 of the demodulated signal in the phase error differentiator 320. The phase error differential 350 is used to determine the offset confidence number 360 (step 570) in the frequency offset direction confidence module 325, and the offset confidence number is used to determine the frequency offset direction (step 575) in the frequency and phase combiner module 330.

Figure 14:
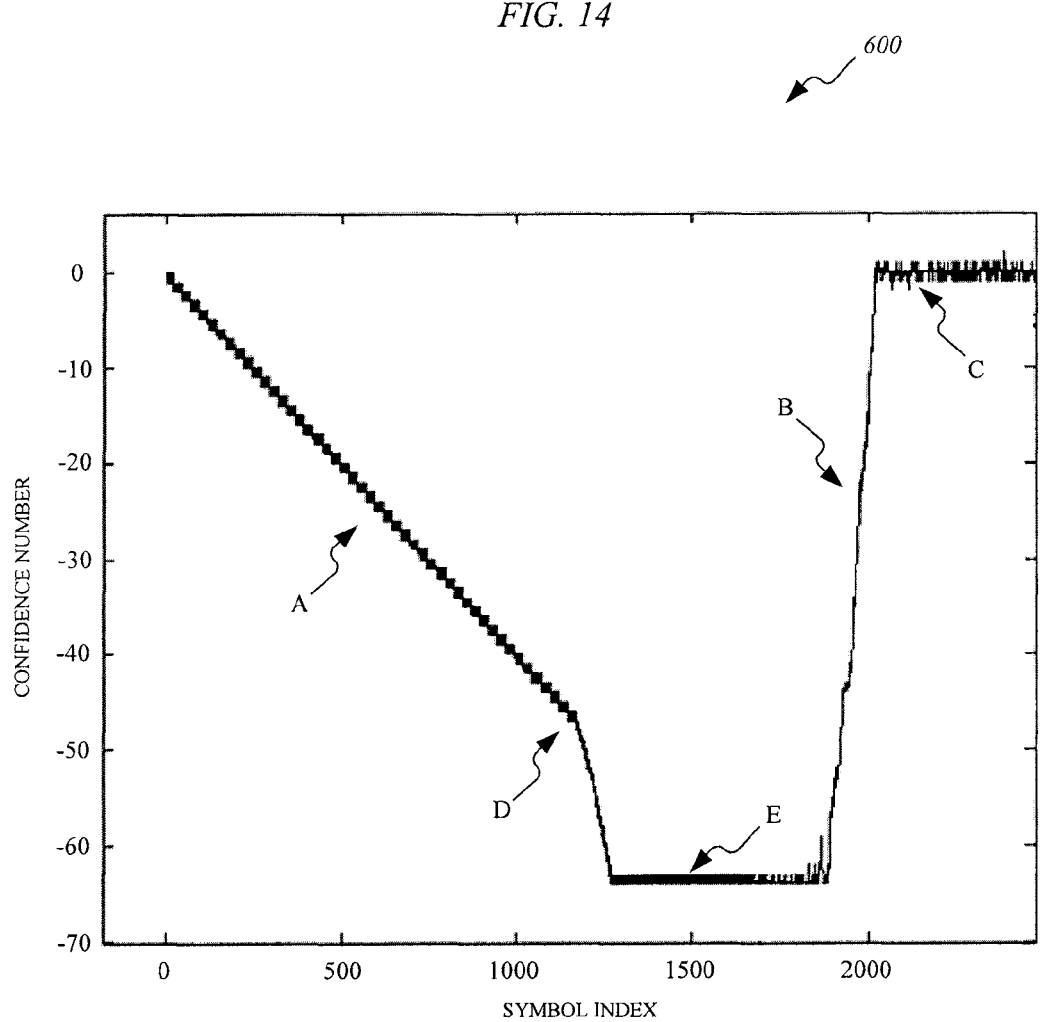
FIG. 14 is a plot of a confidence number with respect to received symbols.

FIG. 14 is a plot 600 of the confidence number 360 for a QPSK system with a frequency offset of $-0.12f_s$. The absolute values of thresholds $T_2$, $T_3$, and $T_4$ are 64, 32, and 48, respectively. As the confidence number 360 decreases to minus the fourth threshold, $-T_4$, in trace A, the carrier recovery system is inactive. Following point D, the FPLL is active. The confidence number 360 saturates at minus the second threshold, $-T_2$, along trace E, and the residual frequency offset becomes smaller. Trace B illustrates the confidence number 360 leaking to zero as the residual frequency offset becomes smaller. After the frequency offset has been compensated to zero, the confidence number 360 remains at zero and only the PLL is active (trace C).

Figure 15:
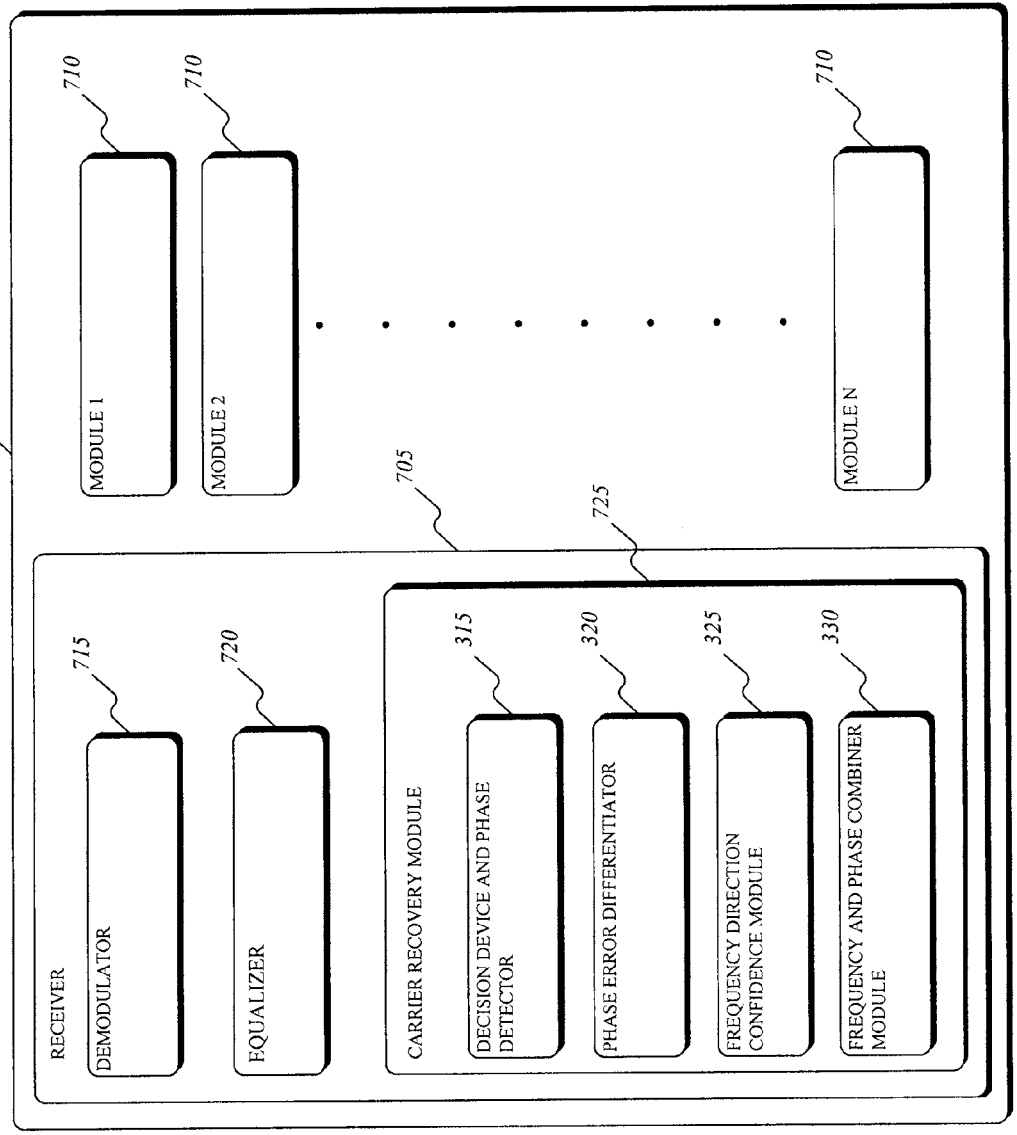
FIG. 15 illustrates a device for implementing the carrier recovery system of FIG. 8.

FIG. 15 illustrates a digital communications device 700 according to an embodiment of the invention. The device 700 is operable to implement the systems and methods for carrier signal recovery described above. The device 700 is implemented partially or entirely on a semiconductor (e.g., FPGA semiconductor) chip, such as a chip developed through a register transfer level ("RTL") design process. The illustrated device 700 includes a receiver module 705 and optional hardware, and/or software module(s) 710 that provide additional functions (e.g., display functions). In other embodiments, the device 700 includes more or fewer modules. For example, certain depicted modules are implemented on other devices that interface with the device 700 (e.g., the receiver module 705 interfaces with a display module incorporated into a separate device).

The receiver module 705 includes a demodulator 715, an equalizer 720, and a carrier recovery module 725. In some embodiments, the receiver module 705 includes one or more additional modules, such as, for example, a tuner, a sync and timing recovery module, a matched filter, a phase tracker, a deinterleaver, a second decoder, a slicer, and/or a derandomizer. The carrier recovery module 725 includes the decision device and phase detector 315, the phase error differentiator 320, the frequency offset direction confidence module 325, and the frequency and phase combiner module 330. The decision device and phase detector 315 generate, among other things, the phase error, and the phase error differentiator 320 calculates the phase error differential 350 between the phase error 345 and the delayed phase error 355. Based on the phase error differential 350, the frequency offset direction confidence module 325 generates the frequency offset confidence number 360. The frequency offset confidence number 360 provides an indication of both the direction of a frequency offset and a degree of certainty related to a detected direction (e.g., positive or negative) of the frequency offset. The frequency and phase combiner 330 uses the phase error 345, the calculated phase error differential 350, and the confidence number 360 for carrier acquisition. If the confidence number 360 is greater than a threshold value, the receiver 705 selects the FPLL for carrier acquisition. If the confidence number 360 is less than the threshold value, the receiver module 705 selects the PLL for carrier acquisition. In some embodiments, the carrier recovery module 725 switches among additional (e.g., three or more) carrier recovery techniques.

Figure 16:
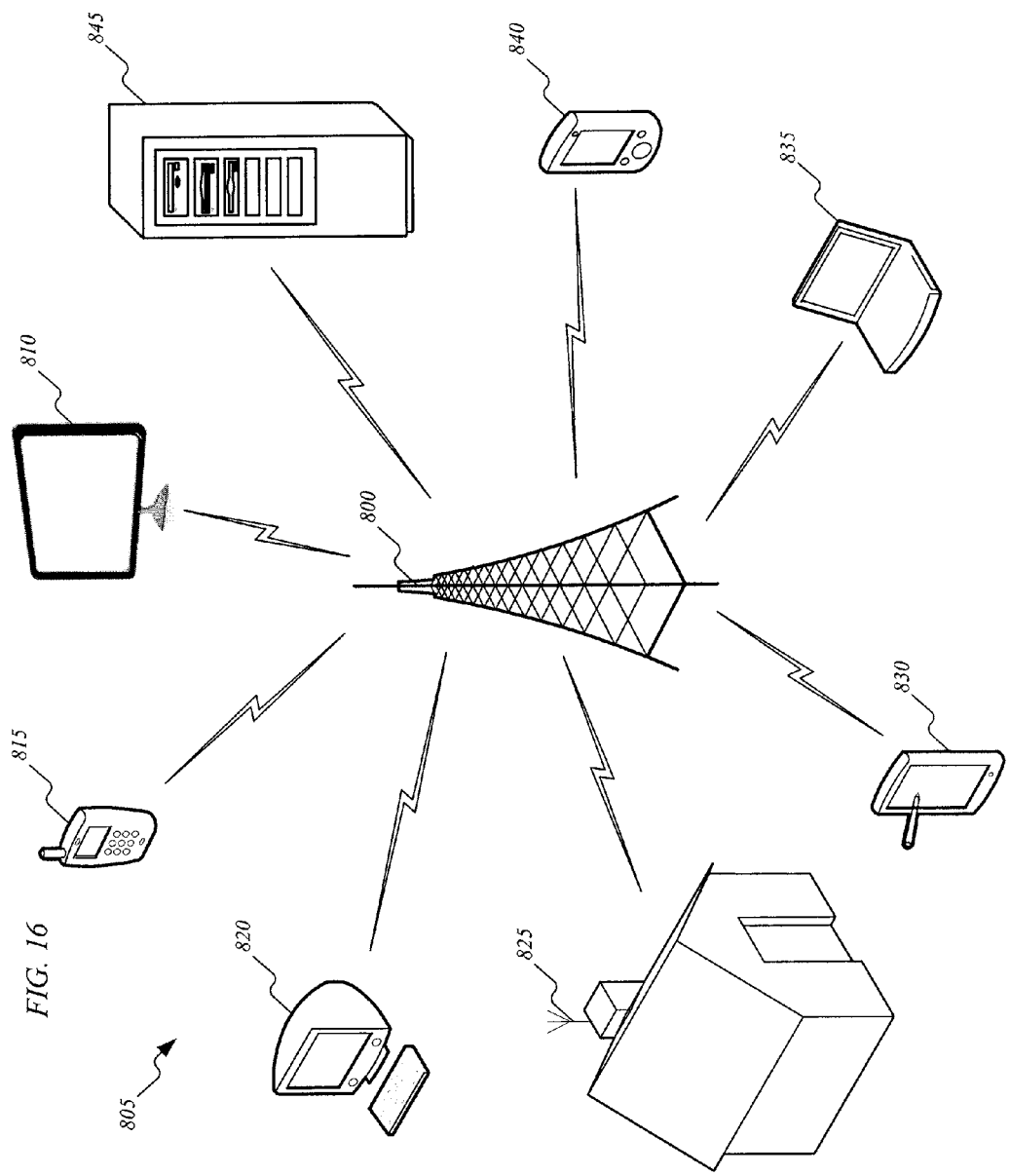
FIG. 16 illustrates a communications system that includes one or more implementations of the device of FIG. 15.

The device 700 is implemented as any of a variety of additional devices which receive radio frequency signals from a transmitter 800, such as those illustrated in the communications system 805 of FIG. 16. For example, the device 700 is incorporated into a television 810, a smart phone 815, a personal computer ("PC") 820 (or a PC adapter card), one or more household antennas 825, a tablet PC 830, a laptop computer 835, a personal digital assistant ("PDA") 840, or a server 845. Additionally or alternatively, the device 700 is incorporated into a receiver (e.g., digital communication receiver), a tuner, a set top box, a DVD recorder, an HDTV recorder, or the like, which are connected to one or more of the devices 810-845 illustrated in FIG. 16.

Thus, the invention provides, among other things, systems and methods for carrier signal acquisition or recovery in a receiver. The receiver is able to achieve carrier acquisition when a frequency offset is large or near a decision boundary. The receiver includes a demodulator, an equalizer, and a carrier recovery module. A frequency offset confidence number is generated, which is related to both the direction of frequency offset and a degree of certainty for the detected direction of the frequency offset. The receiver selects a first carrier acquisition technique or a second carrier acquisition technique based at least in part on the confidence number. Various features and advantages of the invention are set forth in the following claims.

What is claimed is:

1. A method of carrier recovery in a digital receiver, the receiver configured to receive radio frequency signals modulated with data including a complex transmitted symbol having an in-phase component and a quadrature component, and to determine a frequency offset direction, the method comprising:

demodulating, in a demodulator, the received radio frequency signals to produce the in-phase and the quadrature components of the complex transmitted symbol;

determining a first phase error at a first time and a second phase error at a second time;

determining a phase error differential between the first phase error at the first time and the second phase error at the second time;

determining an offset confidence number based at least in part on the phase error differential;

determining the frequency offset direction based at least in part on the offset confidence number;

wherein the offset confidence number is indicative of a degree of certainty of the determined frequency offset direction; and comparing the offset confidence number to a first threshold value.

2. The method of claim 1, further comprising selecting a phase lock loop for carrier recovery when the offset confidence number is less than the first threshold value.

3. The method of claim 1, further comprising selecting a frequency and phase lock loop for carrier recovery when the offset confidence number is greater than the first threshold value.

4. The method claim 1, further comprising comparing the offset confidence number to a second threshold value.

5. The method of claim 4, further comprising delaying carrier recovery if the offset confidence number is less than the second threshold value.

6. The method of claim 1, further comprising comparing the phase error differential to a predetermined threshold value.

7. The method of claim 6, further comprising decreasing the offset confidence number when the phase error differential is less than the predetermined threshold value.

8. The method of claim 6, further comprising updating the offset confidence number based on a sign of the phase error differential when the phase error differential is greater than the predetermined threshold value.

9. The method of claim 1, further comprising comparing a sign of the offset confidence number to a sign of the phase error differential.

10. The method of claim 9, further comprising discarding the phase error differential when the sign of the offset confidence number and the sign of the phase error differential are not the same.

11. A method of tracking phase in a digital receiver, the receiver configured to receive radio frequency signals modulated with data including a complex transmitted symbol having a real component and an imaginary component, and to determine a frequency offset direction, the method comprising:
- demodulating, in a demodulator, the received radio frequency signals to produce the real and the imaginary components of the complex transmitted symbol;
- calculating a phase error differential between a first phase error at a first time and a second phase error at a second time;
- generating an offset confidence number based at least in part on the phase error differential;
- determining the frequency offset direction based at least in part on the offset confidence number; and
- comparing the offset confidence number to a first threshold value.

12. The method of claim 11, further comprising selecting a frequency and phase lock loop for carrier recovery when the offset confidence number is greater than the first threshold value.

13. The method of claim 11, further comprising comparing the offset confidence number to a second threshold value.

14. The method of claim 13, further comprising delaying carrier recovery if the offset confidence number is less than the second threshold value.

15. The method of claim 11, further comprising comparing the phase error differential to a predetermined threshold value.

16. The method of claim 15, further comprising decreasing the offset confidence number when the phase error differential is less than the predetermined threshold value.

17. The method of claim 15, further comprising updating the offset confidence number based on a sign of the phase error differential when the phase error differential is greater than the predetermined threshold value.

18. The method of claim 11, further comprising comparing a sign of the offset confidence number to a sign of the phase error differential.

19. The method of claim 18, further comprising discarding the phase error differential when the sign of the offset confidence number and the sign of the phase error differential are not the same.

20. A system for carrier recovery, the system configured to receive radio frequency signals modulated with data including a complex transmitted symbol having an in-phase component and a quadrature component, and to determine a frequency offset direction, the system comprising:
- a demodulator configured to demodulate the received radio frequency signals to produce the in-phase and the quadrature components of the complex transmitted symbol;
- a carrier recovery module configured to
  - calculate a phase error differential between a first phase error at a first time and a second phase error at a second time;
  - generate an offset confidence number based at least in part on the phase error differential;
  - determine the frequency offset direction based at least in part on the offset confidence number;
  - wherein the offset confidence number provides an indication of a degree of certainty of the determined frequency offset direction; and
  - compare the offset confidence number to a first threshold value.

21. The system of claim 20, wherein the carrier recovery module is further configured to select a frequency and phase lock loop for carrier recovery when the offset confidence number is greater than the first threshold value.

22. The system of claim 20, wherein the carrier recovery module is further configured to compare the offset confidence number to a second threshold value.

23. The system of claim 22, wherein the carrier recovery module is further configured to delay carrier recovery if the offset confidence number is less than the second threshold value.

24. The system of claim 20, wherein the carrier recovery module is further configured to compare the phase error differential to a predetermined threshold value.

25. The system of claim 24, wherein the carrier recovery module is further configured to decrease the offset confidence number when the phase error differential is less than the predetermined threshold value.

26. The system of claim 24, wherein the carrier recovery module is further configured to update the offset confidence number based on a sign of the phase error differential when the phase error differential is greater than the predetermined threshold value.

27. The system of claim 20, wherein the carrier recovery module is further configured to compare a sign of the offset confidence number to a sign of the phase error differential.

28. The system of claim 27, wherein the carrier recovery module is further configured to discard the phase error differential when the sign of the offset confidence number and the sign of the phase error differential are not the same.

29. A device configured to process digital signals, the device comprising:
- a receiver including a demodulator, an equalizer, and a carrier recovery module;
- the receiver configured to receive quadrature amplitude modulated ("QAM") signals with data including a complex transmitted symbol having a real component and an imaginary component,
- the demodulator configured to demodulate the QAM signals to produce the real and the imaginary components of the complex transmitted symbol, and
- the carrier recovery module configured to
  - calculate a phase error differential between a first phase error at a first time and a second phase error at a second time;
  - determine an offset confidence number based at least in part on the phase error differential;
  - determine a frequency offset direction based at least in part on the offset confidence number;
  - wherein the offset confidence number provides an indication of a degree of certainty of the determined frequency offset direction; and
- compare the offset confidence number to a first threshold value.

30. The device of claim 29, wherein the device is a television, a PC adapter card, a set top box, a DVD recorder, a HDTV recorder, a phone, or a handheld device.

31. The device of claim 29, wherein the device is configured for use in a broadcast system, a wireless local area network ("LAN") system, or a wide area mobile system.

* * * * *